(12) United States Patent
Berglund et al.

(10) Patent No.: US 6,181,029 B1
(45) Date of Patent: Jan. 30, 2001

(54) METHOD OF CONTROLLING BATTERY BACK-UP FOR MULTIPLE POWER SUPPLIES

(75) Inventors: Neil C. Berglund, Kasson; Patrick K. Egan; Steven W. Steele, both of Rochester; John V. Swenson, Oronoco, all of MN (US)

(73) Assignee: International Business Machines Corporation, Armonk, NY (US)

( * ) Notice: Under 35 U.S.C. 154(b), the term of this patent shall be extended for 0 days.

(21) Appl. No.: 09/187,067

(22) Filed: Nov. 6, 1998

(51) Int. Cl.[7] ........................................... H02J 9/00
(52) U.S. Cl. ................................................ 307/66
(58) Field of Search ..................... 307/18, 23, 29, 307/43, 46, 48, 64–66, 72, 80, 85–87; 323/234, 282, 285; 363/74, 78, 84

(56) References Cited

U.S. PATENT DOCUMENTS

| | | | |
|---|---|---|---|
| 5,019,717 | * 5/1991 | McCurry et al. | ........................ 307/66 |
| 5,465,011 | 11/1995 | Miller et al. | . |
| 5,530,635 | 6/1996 | Yashiro | . |
| 5,576,941 | * 11/1996 | Nguyen et al. | ........................ 363/21 |
| 5,579,197 | 11/1996 | Mengelt et al. | . |
| 5,602,462 | 2/1997 | Stich et al. | . |
| 5,610,451 | 3/1997 | Symonds | . |
| 5,610,805 | 3/1997 | Gupta | . |
| 5,631,814 | 5/1997 | Zak | . |
| 5,659,207 | 8/1997 | Chang | . |
| 5,684,686 | 11/1997 | Reddy | . |
| 5,694,312 | 12/1997 | Brand et al. | . |
| 5,729,120 | 3/1998 | Stich et al. | . |
| 5,737,204 | 4/1998 | Brown | . |
| 5,737,209 | 4/1998 | Stevens | . |
| 5,757,635 | 5/1998 | Seong | . |
| 5,760,495 | 6/1998 | Mekanik | . |
| 5,761,084 | * 6/1998 | Edwards | ................................... 307/23 |
| 5,764,504 | 6/1998 | Brand et al. | . |
| 5,808,376 | * 9/1998 | Gordon et al. | ........................ 307/66 |
| 5,834,858 | * 11/1998 | Crosman, III et al. | ................ 307/66 |

FOREIGN PATENT DOCUMENTS

| | | |
|---|---|---|
| WO 9423452 | 10/1994 | (WO) . |
| WO 9521485 | 8/1995 | (WO) . |
| WO 9617260 | 6/1996 | (WO) . |

OTHER PUBLICATIONS

Jackson CR, Joyce JM, Wheeler WR. IBM Technical Disclosure Bulletin. vol. 27, No. 7A; Dec. 1984: 4106–4107.

* cited by examiner

*Primary Examiner*—Fritz Fleming
(74) *Attorney, Agent, or Firm*—Christopher H. Lynt

(57) ABSTRACT

A power system includes a battery back-up unit (BBU) having back-up battery circuitry which provides battery back-up support for a plurality of power supplies each having a respective power factor correction circuit front-end with a boost stage. The voltages output from the boost stages of the power supplies are monitored and compared with respective reference threshold voltages to derive a signal which is used to bring battery back-up power on-line when a monitored voltage falls below a threshold voltage, which may be indicative of a loss of AC mains input voltage. AC mains input voltage is also monitored to detect a restoration and disconnect the battery back-up power. In the event that battery back-up is brought on-line due to a faulty power supply rather than a loss of AC mains input voltage, the faulty power supply can be masked and reported for repair.

21 Claims, 6 Drawing Sheets

METHOD OF CONTROLLING BATTERY BACK-UP FOR MULTIPLE POWER SUPPLIES

BACKGROUND OF THE INVENTION

1. Field of the Invention

The invention relates to the field of power supplies, and in particular, to power supplies having battery back-up.

2. Background Information

Power supplies having back-up battery circuitry are known, such as uninterruptible power supplies (UPS's). In some power supplies having battery back-up, the batteries are always on-line, that is connected to the power supply output, and these are referred to as continuous battery back-up power supplies. In another variety of power supply, the batteries are switched to be on-line only when they are needed, and these are referred to as switched battery back-up power supplies. The present invention is directed to the switched back-up power supply variety.

In a known type of switched back-up power supply, the alternating current (AC) input to the power supply, also called the AC mains, is monitored/sensed with an AC sensor to determine when to switch the supply to run on the back-up batteries. However, there are many times when the AC monitoring/sensing is either too sensitive or not sensitive enough. These sensitivity problems result in either the batteries being brought on-line when they are not really needed, or not being brought on-line in time to avoid a negative consequence to the electronic equipment they support, e.g., too late to avoid a computer system crash.

If the sensitivity of the AC sensor is too high, the batteries may be brought on-line in response to power line noise when there is no real threat of an outage. In noisy installations, this can cause frequent unnecessary switching to back-up battery power, which may be wasteful of the energy stored in the batteries and could result in discharged batteries when a real back-up situation is present thereby causing a computer crash and/or result in other negative consequences over time to the battery back-up circuitry.

On the other hand, if the sensitivity of the AC sensor is too low, a substantial rapid AC power drop could occur without the back-up batteries coming on-line soon enough to avoid a substantial reduction in power supply output. Such a sudden power supply output drop could adversely affect sensitive electronic equipment, and in the case of computer systems, it could cause a computer system crash.

Therefore, a need exists for a better method of, and apparatus for, detecting when to bring the battery back-up circuits on-line reliably, so that battery energy is not wasted by bringing the battery back-up on-line when the batteries are not needed, but so that battery back-up is brought on-line when it is needed and in time to avoid a negative consequence, such as a computer system crash.

Some past attempts at solving this sensitivity problem have resulted in more expensive and complex AC sensing circuitry, while still generally not achieving optimum results. There is still room for improvement in determining when to bring battery back-up on-line since errors still frequently occur. Because of this, prudent design currently errs on the side of being over-sensitive in critical applications, such as for computer system back-up, to rule-out an occurrence of a loss of power. This tends to make such battery back-up systems expensive to operate and maintain, because the back-up batteries experience unnecessary recharge cycles, which can substantially shorten their useful life.

As is also known in the art, power supplies used with data processing equipment, for example, often require power factor correction (PFC) circuits to meet AC line harmonic requirements. As is known in the art, maximum power is delivered to a load when the voltage and the current are in phase. In circuits where the voltage/current is changing in magnitude, i.e., in AC circuits and pulsing DC circuits, such as power supplies, and where there is an inductive or capacitive load, the peak voltage will either lead or lag behind the current with respect to phase, and therefore less than 100% of the possible instantaneous power will be delivered to the load. A numerical value called the power factor relates the actual power delivered to the load to 100%. The power factor is thus the ratio of the actual power to 100%. In power supplies without power factor correction, a relatively low power factor of 0.7 is typical. Power factor correction circuitry attempts to get the power factor as close to 1.0 as possible.

As is known in the art, a capacitive load can be tuned to increase the instantaneous power delivered by adding an inductance, and an inductive load by adding a capacitance, for a given frequency. Power supplies typically provide a rectified AC (pulsed DC) voltage to a large storage capacitance which soon charges to the peak voltage of the AC input to the rectifier. Thereafter, the rectifier diodes only conduct when the AC input reaches approximately its peak values due to the reverse bias effect of the storage capacitance and the capacitance's slow discharge rate. The output of the diodes thus appears as a series of pulses rather than the desired ideal sinusoid.

In power circuits, the fundamental frequency of the AC input to the power supply is a nominal 60 Hz (in the U.S.). A full wave rectifier outputs sinusoidal pulses of DC with twice this fundamental frequency, i.e., 120 Hz. However, the situation is complicated by the fact that for a variety of reasons, there are generally a number of significant harmonics of the fundamental frequency on the power line and produced by the power supply itself. A line transformer is often used to electrically isolate the power supply from the AC line, and the transformer reduces the harmonics from the line.

Due to the large storage capacitance used in the power supply, the rectifier diodes only conduct during a part of the AC cycle near the peaks. Therefore, the diode current appears to be more like a series of short pulses, and as is known in the art, this produces more harmonics. Also, power line and load impedance can change at any time, for example, as the devices which make up the load are connected and disconnected from the power supply, e.g., turn on and off. In a computer system, for example, when a floppy drive is accessed, its motor is turned on, changing the load on the power supply.

In power supplies having a large storage capacitance, an inductance, sometimes referred to as a choke coil, is often provided to help to tune the load on the rectifier, reduce harmonics caused by the rectifier, and increase the power factor by bringing the current closer in phase to the voltage. However, additional measures, i.e., power factor correction circuits, are used to increase the power factor and cure the problem of AC line harmonics. Since the harmonics are out of phase with the fundamental frequency during part of their cycles, at least part of the energy otherwise available is lost.

As already mentioned, power factor correction circuits are known. An example of a power factor correction circuit is described and shown in FIG. 1 herein corresponding to FIG. 2 of U.S. Pat. No. 5,737,204 by Alan E. Brown. In the power supply 200 of FIG. 1, a power factor correction (PFC) circuit includes an inductance (L), a diode (D1) and a controlled switch (Q) disposed between a bulk capacitor (C) and a full-wave bridge rectifier 104. The switch (Q) is controlled so that the voltage (VDC2) at the capacitor (C) is regulated to a be at a predetermined level, and so that the PFC circuit appears to be a purely resistive load, i.e., so that the current and voltage at the PFC input are essentially in phase.

The switching provides a regulated DC voltage by switching current through the diode (D1) and inductor (L) into the capacitance (C). The capacitance (C) is coupled to output a DC voltage to a main power converter 108 as its load.

In the power supply 200 of the Brown patent shown herein in FIG. 1, a battery back-up interface circuit (BBIC) is switched to be connected to the input of the power factor correction circuitry (PFC) when a drop in the PFC circuit voltage output (VDC2) is detected with voltage monitor 202. The power factor correction circuit (PFC) now also acts as a boost circuit to boost the battery (B) voltage (VDC1) provided to the PFC circuit to the appropriate level (VDC2) at the capacitance (C). The boosting is achieved by switching the input voltage on and off through switch (Q) by pulse width modulation control 106 and by virtue of the inductance (L) and capacitance (C) being a tuned circuit, i.e., operating as a "chopper."

The FIG. 1 battery back-up system of Brown has only one PFC front-end and power converter 108. As just described, the battery back-up is brought on-line by sensing the voltage output of the boost section of the PFC circuit, and turning-on the battery switch (S) FET with the control circuit (110) when this output voltage reaches a predetermined low level. The signal interfacing the battery back-up switch control 110 to the PFC front-end power supply voltage monitor 202 is labeled "ON" in FIG. 1.

However, although U.S. Pat. No. 5,737,204 of Brown has shown a method of interfacing a DC battery back-up to a single PFC power supply front end in response to an AC outage condition, as described above, a need exists for a battery back-up system for supporting a plurality of PFC front-end power supplies to a single battery back-up.

Further, a need exists for a battery back-up system to handle the case where one (or more) of the power supplies is defective and the respective PFC boost circuit(s) does not work properly. In such a situation, a need exists for controlling the battery back-up so that the battery back-up does not turn on, or if already on turns off, for this condition.

Further, in Brown's circuit shown herein in FIG. 1, detecting the restoration of main AC power 102 is done by sensing the voltage across a diode (D2) with a voltage detector 204, and controlling the battery switch FET (S) to disconnect the battery (B). In an alternative embodiment of Brown (see Brown patent FIG. 1), one or more missing cycles of AC will be detected with a detection circuit 112 which then causes switching on of the battery back-up circuitry. In that embodiment, restoration of AC is determined by a return of one or more AC cycles detected by the detection circuit 112 which then switches the battery back-up off.

However, in either embodiment of Brown, Brown only detects a complete loss/return of AC power with the AC cycle detection circuit 112. Such a circuit cannot detect a brown-out condition, i.e., a condition where the AC line voltage is present but reduced to a level where circuit malfunction could occur, e.g., below about 5% of the nominal AC line voltage.

Therefore, a need exists for an alternative method of turning the battery back-up ON when AC input is lost or reduced by a significant amount, and OFF when AC has been restored and/or returned to a nominal threshold voltage level.

Therefore, a need exists for an improved method of determining when to use battery back-up that achieves optimum results in solving the basic problem without requiring expensive and complex AC sensing circuitry.

In particular, there exists a need for an apparatus and method of controlling a single battery back-up system which can back-up a plurality of PFC power supplies; there exists a need for an apparatus and method of controlling a single battery back-up system which can detect a brownout condition and provide battery back-up; and there exists a need for an apparatus and method of controlling a single battery back-up system which can detect a PFC power supply failure and take appropriate action to disconnect the battery back-up from the failed power supply.

SUMMARY OF THE INVENTION

It is, therefore, a principle object of this invention to provide an improved method and apparatus for controlling when to use a battery back-up supporting multiple power supplies.

It is another object of the invention to provide a method and apparatus that solves the above mentioned problems so that battery back-up is used more efficiently and reliably.

These and other objects of the present invention are accomplished by the method and apparatus disclosed herein.

According to an aspect of the invention, in a power system having a battery back-up unit which includes at least one battery and associated battery back-up circuitry, the power system further having a plurality of power supplies, each power supply being connected to the battery back-up unit, and each power supply having a front end section including a power factor correction circuit with a boost stage providing an output voltage, a method of controlling battery back-up includes detecting a drop below a threshold level of the boost stage output voltage of at least one of the plurality of power supplies, signaling the battery back-up circuit to bring battery back-up power on-line providing battery power to the plurality of power supplies.

According to an aspect of the invention, if after the battery back-up comes on-line, a drop of the boost stage output voltage is detected in any of the plurality of power supplies, then a power supply fault condition is detected, and the battery back-up is disconnected from the respective power supply. A fault in the respective power supply is signaled so that the power supply can be repaired or replaced, or other corrective action taken.

According to another aspect of the invention, AC sensor circuitry detects the AC input to the battery back-up unit. If the battery back-up power is on-line, and the sensor circuitry detects a return of the AC input to a level above the threshold level, then the sensor circuitry signals (e.g., to the System Power Control Network) that the battery back-up circuits can take the battery back-up power off-line.

According to another aspect of the invention, the power system has an interface to a system power control network. The system power control network communicates power supply information to the battery back-up circuitry.

These and other aspects of the invention will become apparent from the detailed description set forth below.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Figure 2A:
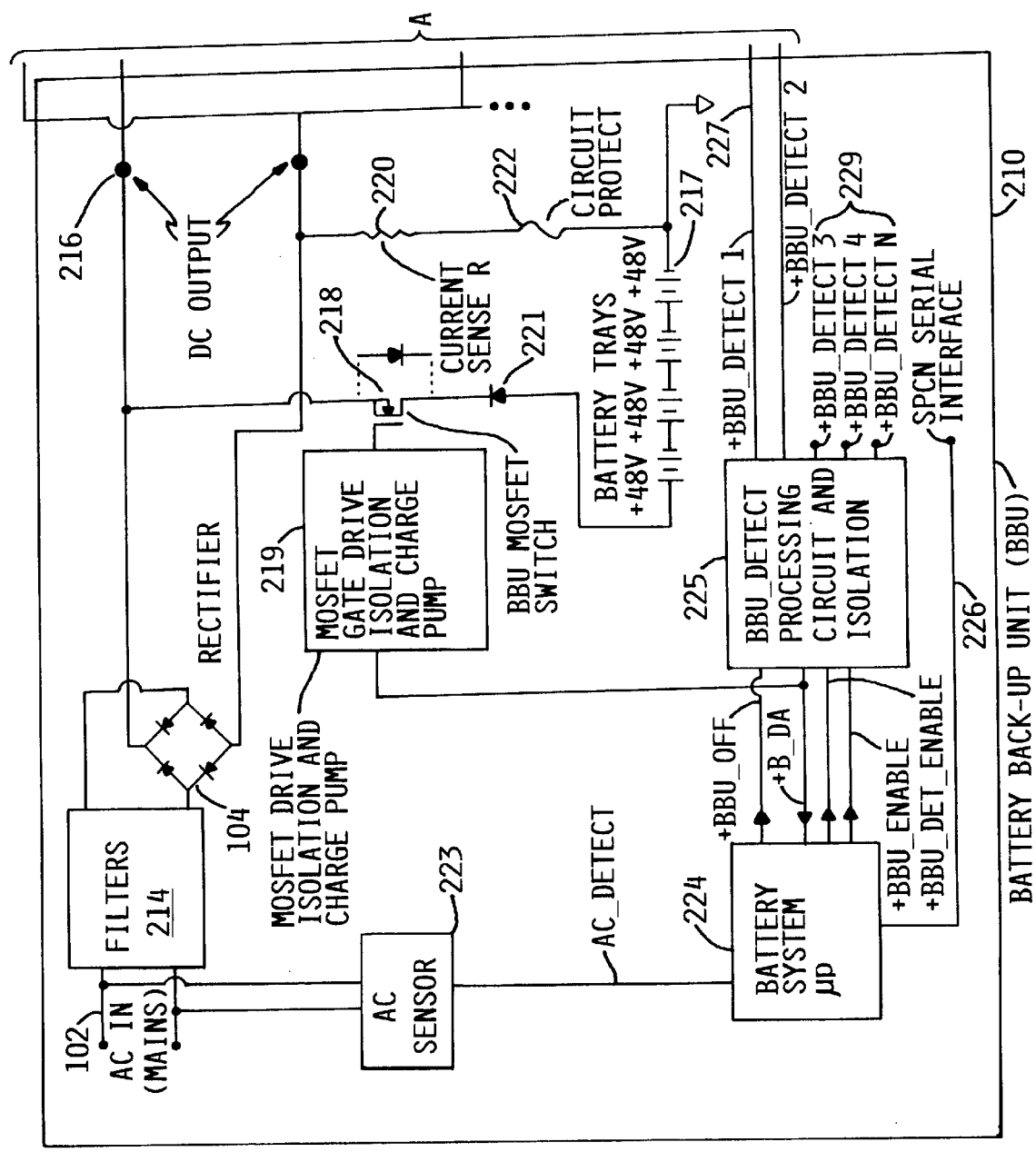
FIG. 2 illustrates a block diagram of a power supply according to an exemplary embodiment of the present invention.
Figure 2B:
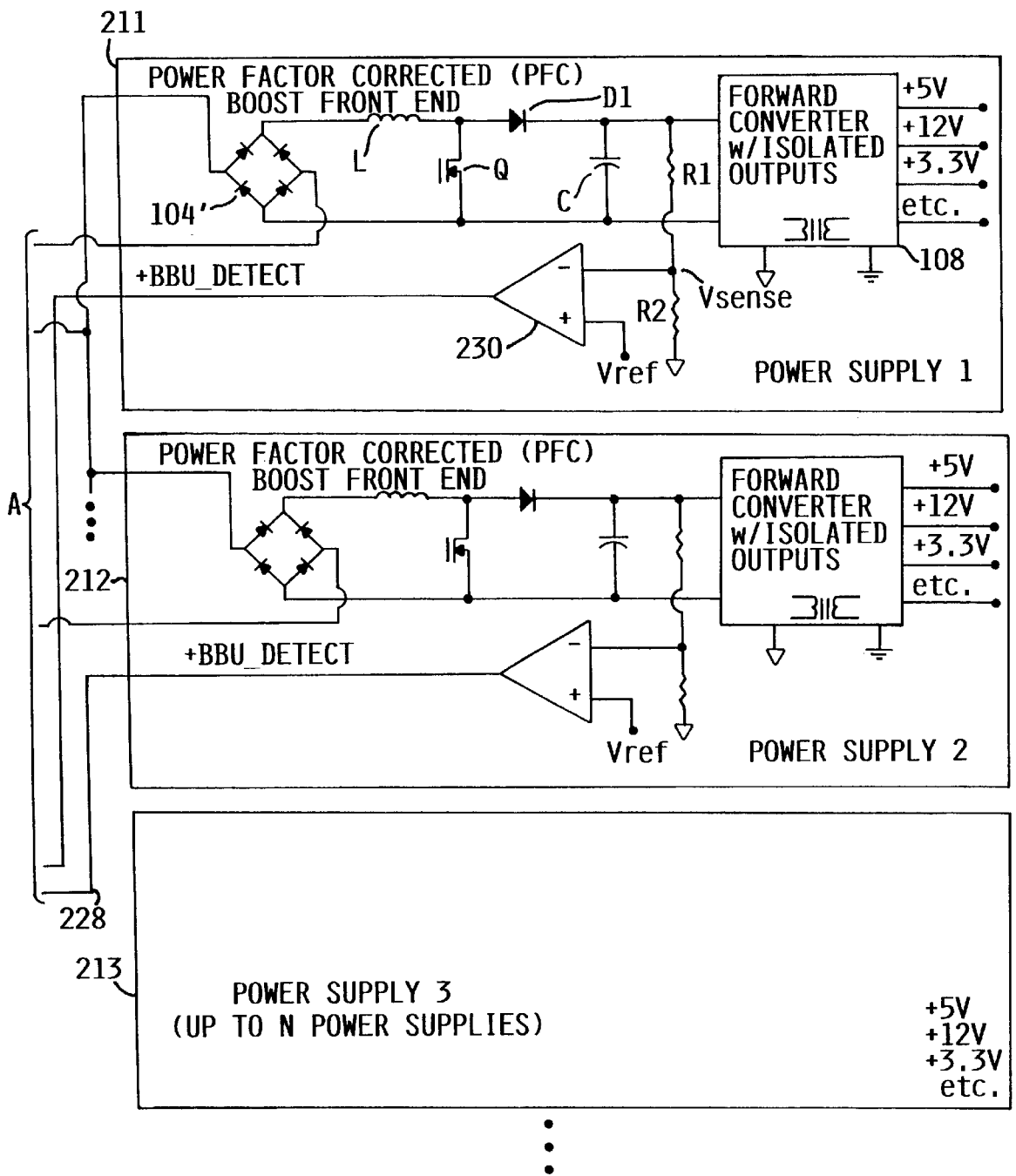

FIG. 2 illustrates an implementation of a battery back-up system for multiple power supplies according to an exemplary embodiment of the invention. The exemplary system includes a battery back-up unit (BBU) 210 on the left-hand side of the figure interfacing with the power factor correction (PFC) boost front-ends 211, 212 and 213 of a respective plurality of power supplies on the right-hand side of the figure.

As illustrated, the battery back-up unit (BBU) 210 receives an AC line (Mains) input 102, filters the AC input with filters 214, and then rectifies the filtered AC with rectifier 104, in particular, a full-wave bridge rectifier. The output of the rectifier 104 is a series of unidirectional sinusoidal pulses (pulsed direct current—DC) which are provided to the power supply front-ends 211, 212, 213 connected at DC output 216.

It should be noted that a bridge rectifier 104' may also be provided in the power supply front-ends 211, 212, 213, as shown, to provide for stand-alone operation. That is, where the power supply front-ends are connected directly to the AC mains 102, i.e., without the battery back-up unit 210 connected therebetween. Of course, if such a stand-alone operation capability of the power supplies is not required, then the additional power supply bridge rectifiers 104' are optional and could be omitted.

Along with the AC filters 214 and the rectifier 104, which provide typical AC-to-DC power supply operation, the exemplary battery back-up unit 210 includes battery back-up circuitry, which will be described in more detail below. However, it would be apparent to those skilled in the art that the battery back-up circuitry could be housed separately from the AC-to-DC power supply circuitry just described, that is, in a separate unit. However, it is generally more convenient to combine the battery back-up with the regular AC-to-DC power supply in one unit.

The battery back-up circuitry includes a switch 218, a diode 221, one or more batteries (e.g., battery trays) 217, a circuit protector (e.g., a fuse) 222 and a current sensing device (e.g. a resistance) 220, this series connection also referred to herein as the battery string, connected across the DC output 216.

The battery string, i.e., the one or more battery trays 217, is configured to be switched-in by a low resistance MOSFET switch 218 when required to provide battery voltage to the DC output 216 to the power supply front-ends 211, 212, 213, thereby replacing the pulsed DC output from rectifier 104. As a safeguard should the battery string be brought on-line when there is a short in a load and the current sense resistance R 220 has malfunctioned, for example, a circuit protection device, e.g., a fuse 222, is provided. With the current sense device, e.g., the resistance 220 in the battery string, the current through the battery string can be monitored to give an indication of the operational state of the battery string and thereby detect over-current situations. Diode 221 prevents a reverse current from flowing into the battery string.

According to the invention, as will be described in more detail below, battery back-up may be brought on-line when the power supply front-end voltage drops to below a threshold value due to, for example, a partial loss (brown-out) or complete loss (outage) of AC mains input, or some other failure resulting in an inadequate DC output 216, such as may be caused by a failure of the rectifier 104 or other component.

Figure 1:
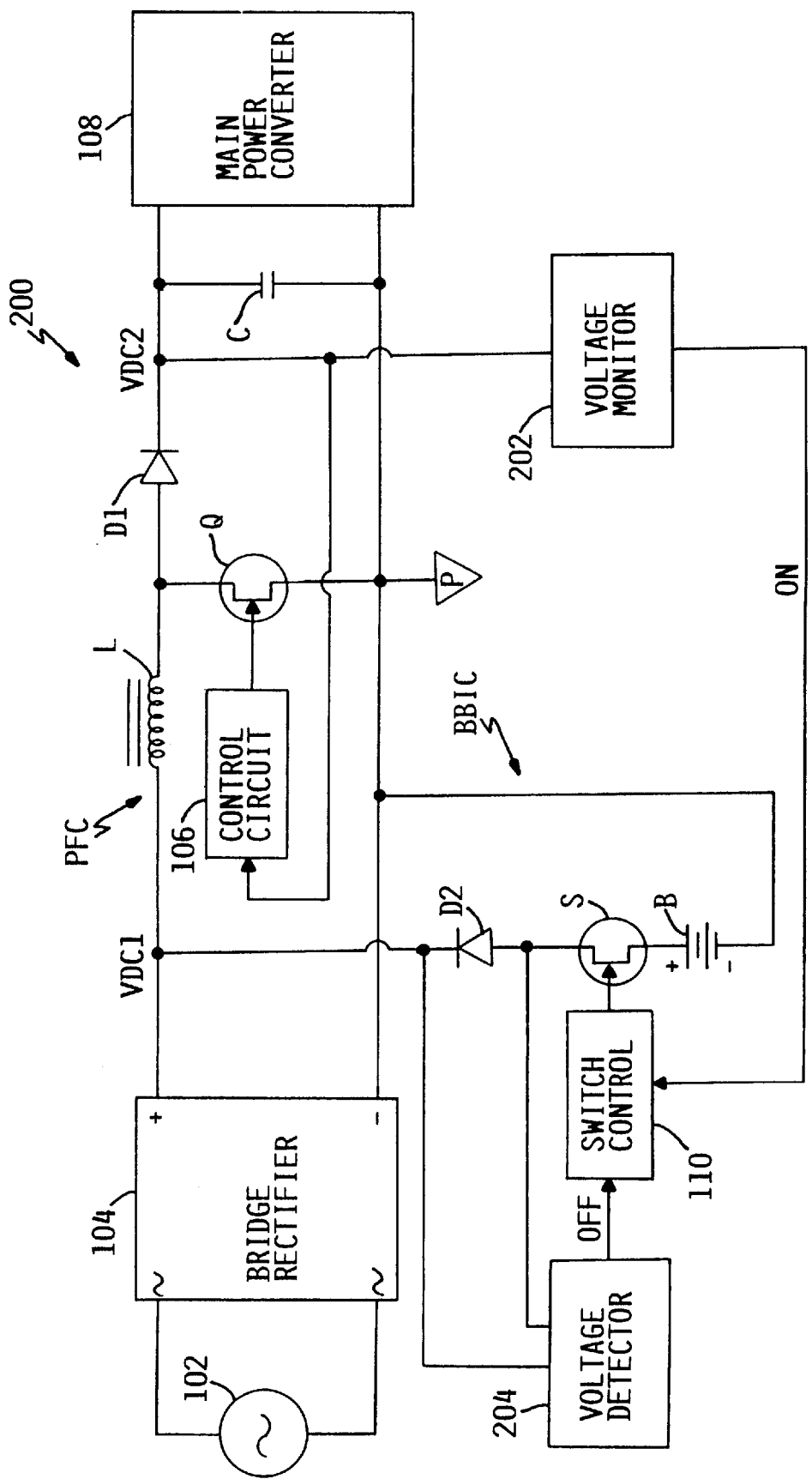
FIG. 1 illustrates a block diagram of a power supply according to the prior art.

Most of the components which implement the battery back-up function are disposed in the battery back-up unit 210 shown on the left-hand side of FIG. 2. On the right-hand side of FIG. 2, typical PFC boost front-ends 211, 212, 213 are shown in block diagram form, modified to include some exemplary circuitry for sensing the PFC boost voltage level, i.e., the forward converter input voltage, and controlling the battery back-up. The conventional components of the PFC boost front-ends are configured as described in the background section with respect to the prior art shown in FIG. 1, and therefore will not be described in much detail here. Like components have been given like reference symbols in FIGS. 1 and 2.

In particular, in each front-end 211, 212, 213, there is provided an inductor L and a diode D1 in series with an input to the forward converter 108 and a first polarity DC input to the power supply front-end (through the optional rectifier 104'). A second polarity input to the front-end is also connected to the converter 108 (through the optional rectifier 104'). A storage capacitance C is provided across the converter 108 inputs. At a node connecting the inductor L and the diode D1, a switch Q is connected to be between the node and the second polarity input to the converter 108. As described in the prior art, this switch Q can be turned on and off to achieve power factor correction and voltage boosting as required.

Added to the conventional PFC boost front-ends 211, 212 213, at the first polarity input to the converter 108, is exemplary circuitry according to the invention for sensing the voltage input to the forward converter 108. In particular, a voltage divider having resistances R1 and R2 is coupled to the positive input to the converter. An inverting input of a comparator 230 is coupled to the junction between resistances R1 and R2. The non-inverting input of the comparator 230 is coupled to a reference voltage Vref. The comparator 230 and the voltage divider resistances R1 and R2, operate to signal to the battery back-up unit 210 control circuitry when the voltage on the first polarity input to the converter 108 drops below the reference voltage Vref. As would be readily apparent to those skilled in the art, comparator 230 is sensitive to very small differences between the voltages at its inputs. When the voltage to the inverting input of the comparator 230, i.e., the voltage at the junction of resistances R1 and R2, drops below the reference voltage Vref, this negative voltage difference is inverted and amplified by the comparator as a positive output voltage. Since the comparator is essentially an OP AMP (operational amplifier) operated without gain-limiting feed-back resistances, the output voltage of the comparator 230 rapidly goes from approximately zero to a saturation voltage, e.g., the comparator supply voltage of +5 volts, when a small difference voltage exists between its inverting and non-inverting inputs.

A signal indicating a sensed voltage difference between the reference voltage and the voltage input to the converter 108 is labeled +BBU_DETECT, and this signal is provided to the processing and isolation block 225 of the battery back-up unit 210. A +BBU_DETECT signal from the PFC power supply front-end provided an indication that the boost output voltage has been sensed low enough to require battery back-up energy. Each of the front-ends provides a respective +BBU_DETECT signal.

A battery back-up system microcontroller/microprocessor 224 (e.g., an 8×C552 microcontroller) exchanges signals with the processing and isolation block 225 to implement battery back-up functions. The microcontroller/ microprocessor 224 in turn has an interface for external control and data signals, e.g., a serial interface to a system power control network (SPCN).

The respective +BBU_DETECT signals for the power supply front-ends 211, 212, 213, are connected to the battery back-up unit (BBU) 210 on separate lines 227, 228, 229, which are monitored by block 225 of the BBU 210. If these front-ends 211, 212, 213, are disposed far-removed from the battery back-up unit 210, appropriate measures may be provided to convey the signal without degradation, such as providing signal conditioning and/or driving circuitry, as would be apparent to one skilled in the art. It should also be noted that the simple voltage sensor arrangement shown, including the voltage divider R1, R2 and comparator 230, is illustrative of the inventive concept, but that a functionally equivalent voltage sensor arrangement could take any number of other forms, as would be apparent to one skilled in the art.

As a further detection feature of the exemplary battery back-up unit 210, an AC sensor 223 is provided which informs the battery back-up system microcontroller/ microprocessor 224 (e.g., an 8XC552 microcontroller) about the AC input (mains) 102 provided to the battery back-up unit. For example, with the AC sensor 223, the back-up system can determine when the AC input 102 has risen to a level where battery back-up can be disconnected, e.g., 5% above a minimum voltage required to fully power the PFC front-ends 211, 212, 213. The minimum voltage for the power supply might be 160V, for example.

A signal line 226, e.g., a serial interface signal line, is shown between the battery back-up microcontroller 224 and an external monitoring and/or control system, e.g., the system power control network (SPCN). The external system (SPCN) would, for example, periodically poll the battery back-up microcontroller 224, gathering information and sending commands. The external system, e.g., SPCN, is generally speaking a microcontroller based operating system that controls various power monitoring and control operations, e.g., power supply and/or device ON/OFF sequencing, field replaceable unit (FRU) isolation, battery enabling, battery testing, tower-to-tower communications, etc., in a multi-enclosure computer system.

As already mentioned, the microcontroller 224 is also connected to the detect processing and isolation block 225 which receives the detect signals 227, 228, 229, from the front-ends 211, 212, 213. To implement battery back-up operation, the microcontroller 224 exchanges signals with the external system power monitoring and control network (SPCN) and with the detect processing and isolation circuitry 225, as will be described in more detail below. The microcontroller 224 also connects to a gate drive and charge pump block 219 which controls BBU MOSFET switch 218 to switch the battery string on-line or off-line. Of course, any number of other ways of implementing battery back-up control could be used within the spirit and scope of the invention.

Figure 3A:
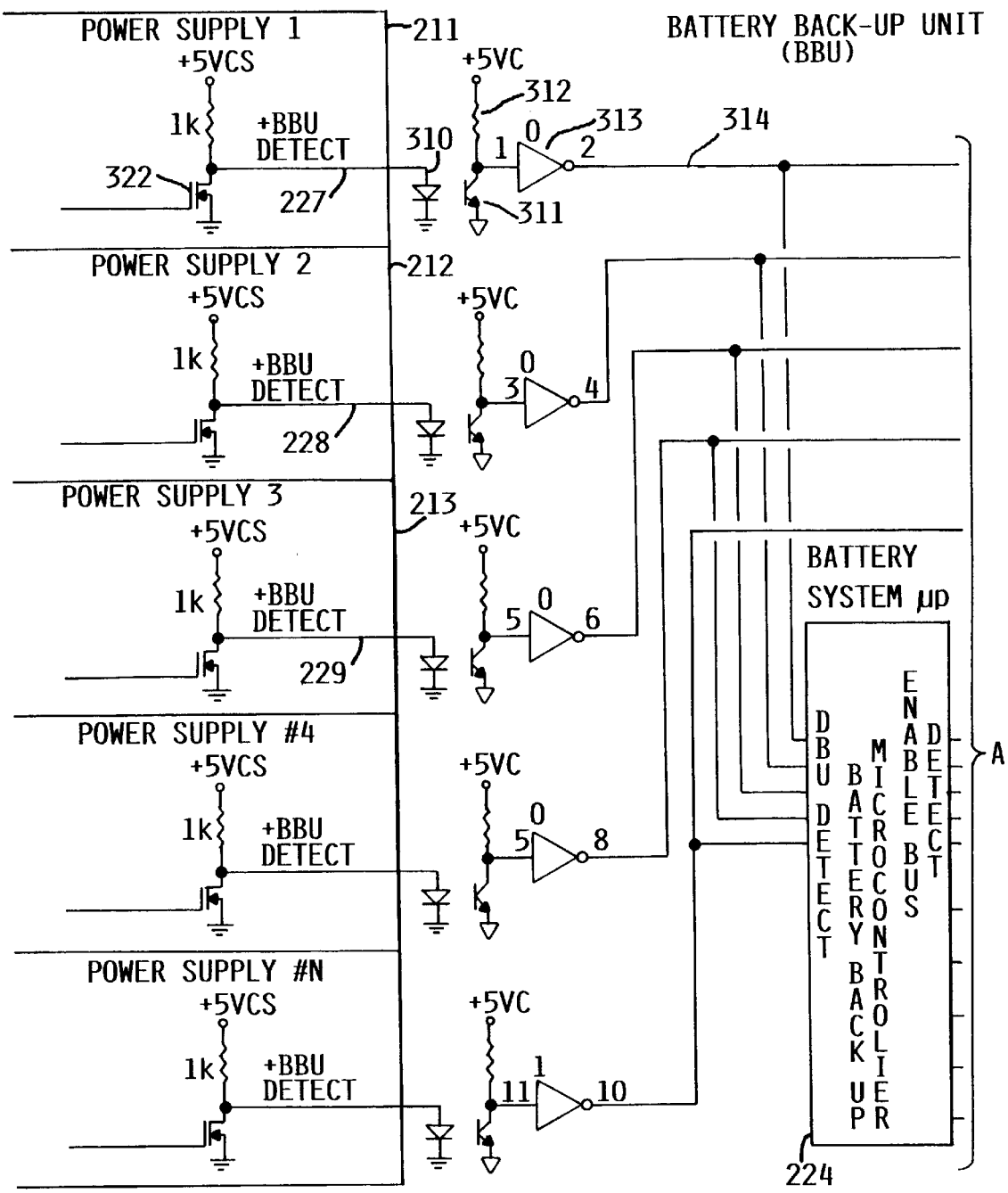
FIG. 3 illustrates a block diagram of the battery back-up control and processing circuitry according to the exemplary embodiment of the present invention shown in FIG. 2.
Figure 3B:
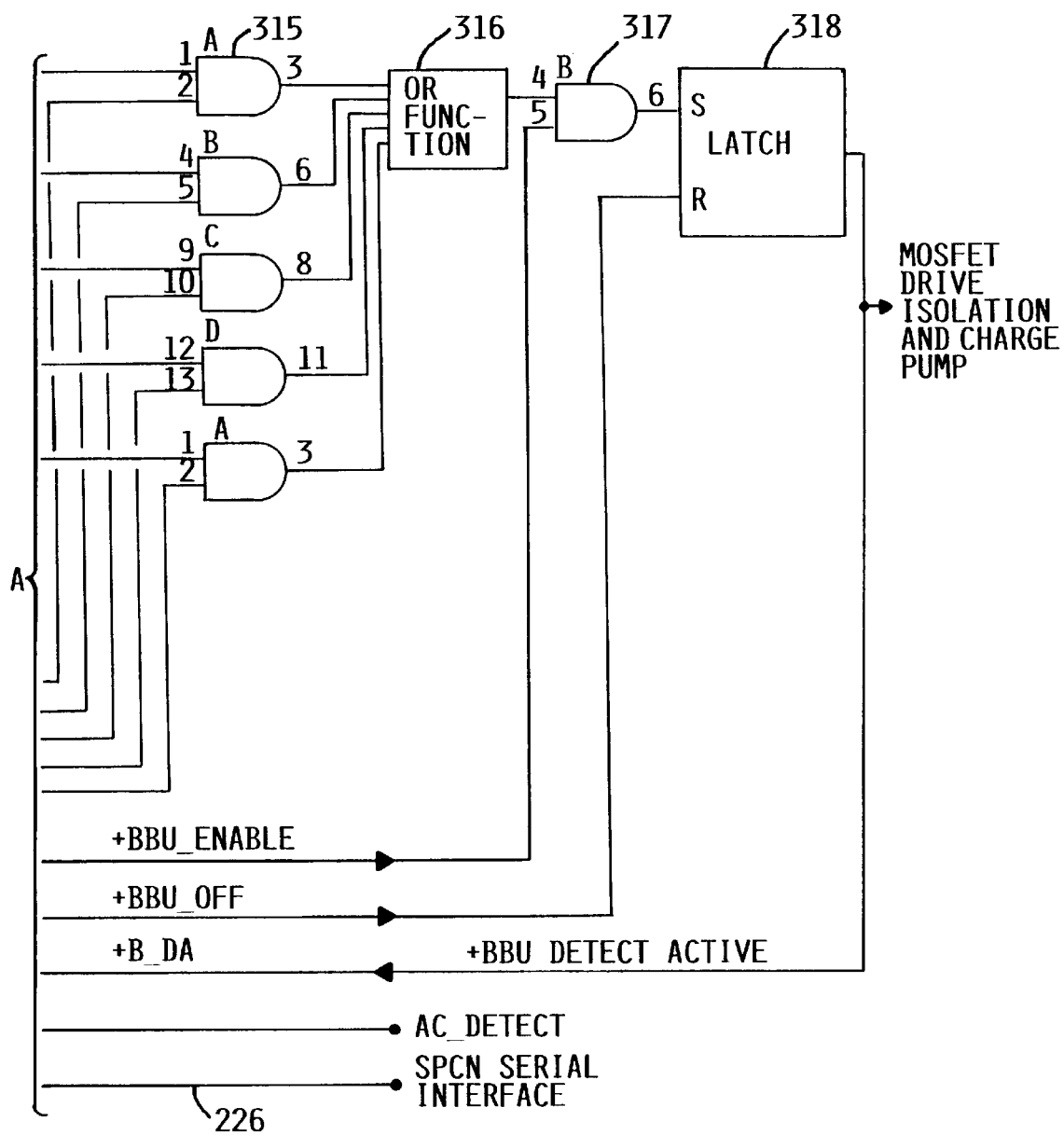

FIG. 3 illustrates an exemplary implementation of battery back-up control for the embodiment of FIG. 2, according to the invention. In particular, FIG. 3 shows a detailed diagram of exemplary controls for a DC battery back-up connected to multiple power supply PFC front-ends. Up to N +BBU_ DETECT signals 227, 228, 229, can be connected to the battery back-up unit (BBU) 210 for the N power supplies installed in a computer system, for example.

Power system operation will now be described in the context of a computer system power system including the battery back-up unit 210. Once the computer power system has been turned-on for a short time period to allow operational voltage levels to be reached, the external power monitoring and control system, e.g., the system power control network (SPCN), determines how many power supplies are connected and functioning properly in the system. Based on this information, an SPCN command will be sent to the battery back-up microcontroller 224 through the SPCN serial interface 226, for example, instructing which +BBU_DETECT signals 227, 228, 229, will be enabled. If, for example, there are four power supplies connected in the system, but only three are actually functional, then the microcontroller 224 of the battery back-up unit 210 would be instructed by SPCN to enable three respective +BBU_ DETECT signals, with the other +BBU_DETECT signals being masked or disabled. This case arises for the following reason. If one of the connected power supplies is a redundant supply, then the system tolerates the failure of one supply. This supply may be concurrently repaired by unplugging it from the battery back-up and then removing the power supply. When the supply is unplugged from its AC/DC source, the supply appears to have lost utility power and it signals the BBU via its BBU Detect signal which would cause the back-up batteries to be connected. However, SPCN can determine that the AC source to the BBU is still available, via the AC sensor, and mask off the unplugged supply until it is replaced with a replacement and reconnected to the BBU. SPCN can determine either through separate communications with the power supply, not described here, or directly via communication with the processor in the BBU, that the replacement power supply is operational and that its BBU Detect signal is in the correct state. At that time, the BBU Detect mask is restored, i.e., the BBU Detect signal from the power supply is no longer masked.

As shown in FIG. 3, the +BBU_DETECT signals 227, 228, 229, are isolated by isolation circuitry, e.g., opto-isolators. For example, with reference to power supply (1) 211, the isolation circuitry includes an optical emitter 310, an optical receiver 311 which is connected to a voltage (+5 Vc) through resistance 312 and to an inverter 313 which provides the isolated output signal 314. The isolated +BBU_DETECT signal 314 is provided to the microcontroller 224 and to an input of a respective AND gate 315. The other input of the respective AND gate 315 is connected to an +ENABLE_BBU_DETECT output of the microcontroller 224. To enable detection, the microcontroller 224 makes the +ENABLE_BBU_DETECT signal to the AND gate 315 a logic level high. The output of this AND gate 315 and the corresponding AND gate outputs for the other isolated detect signals are provided to a logical OR function block 316 so that any one of the AND gate outputs will cause an ouput of the OR block 316.

After the system has powered-on, and SPCN has enabled the proper +BBU_DETECT signals in the battery back-up system, and the +ENABLE_BBU_DETECT signals have been set, as just described, SPCN then instructs the battery back-up system micro-controller 224 to enable the high-power discharge function capability by forcing the +BBU_ENABLE signal high. The +BBU_ENABLE signal, as illustrated, is provided to an input of AND gate 317, whose output is provided to the set (S) input of RS latch 318. The other input of the AND gate 317 is the output of the logical OR function block 316 already described. The output of the RS latch 318 is fed back to the microcontroller as the +BBU_DA (detect active) signal, and provides the MOSFET drive (FIG. 2 block 219) to control the BBU MOSFET switch 218 which connects or disconnects battery string to the BBU output 216.

As can be appreciated, with all the above-mentioned relevant enable signals active, whenever any of the enabled +BBU_DETECT signals 227, 228, 229, go high, indicating a front-end voltage decrease below the reference voltage threshold, the +BBU_DA (detect active) signal will be latched high by RS latch 318. This drives the BBU MOSFET switch 218 to turn ON, thereby causing the battery back-up to come on-line, i.e., to connect the battery string having batteries 217 to the BBU 210 output, providing battery back-up power to the input of each power supply PFC front-end 211, 212, 213.

Preferably, the battery back-up is connected to provide the back-up output power on power distribution lines in not less than 1 millisecond after any of the enabled +BBU_DETECT signals go high. This minimizes the chance that a computer system being backed-up could experience a crash due to a loss of sufficient power during the switching.

As can be appreciated, a +BBU_DETECT signal will go active if there is an energy shortage at any of the PFC front-ends of the power supplies due to a loss of adequate AC mains input (a brown-out or an outage) or a failure in the rectifier 104 of the BBU 210, for example, or when any one of the enabled system power supplies fails.

If the +BBU_DETECT going active is due to a loss of adequate AC mains input or a failure in the rectifier 104 of the BBU 210, connecting the battery string to the input of the power supplies will shortly force the +BBU_DETECT signals low (inactive) again. However, since the +BBU_DA (detect active) signal from RS latch 318 is latched high, the battery string MOSFET switch 318 will still remain closed (battery back-up connected) until the battery back-up micro-controller 224 resets the RS latch 318, which is accomplished with the +BBU_OFF signal to the reset (R) input of the RS latch 318.

The microcontroller 224 could be instructed to reset the latch 318 by the SPCN, and/or this could be in response to the AC_DETECT signal from the AC sensor 223. That is, SPCN could issue an instruction to the microcontroller 224 in the battery back-up unit 210 to disconnect the battery back-up power from the BBU output if the SPCN determines from the AC sensor 223 output, that adequate AC input to the BBU has been restored. Alternatively, the microcontroller 224 could be programmed to perform this operation independently. In either case, the +BBU_OFF signal from the battery back-up microcontroller 224 would go high to reset the RS latch 318.

It should also be noted that if one of the +BBU_DETECT signals stays active even after the battery back-up power is connected or even after AC input has returned to an adequate level, this could mean there is a corresponding power supply front-end with a fault. For this case, SPCN, through the microcontroller of the battery back-up, could disable or mask the failed power supply +BBU_DETECT signal and request remedial action be taken with respect to that power supply. However, such a condition could also mean there is a problem with one or more of the battery string components. Therefore, the system may simply default to disconnect the battery string and report a fault situation.

However, such fault-handling/remedial considerations are generally beyond the scope of this disclosure and it is sufficient to say that means are provided to detect such fault occurrences. What happens depends on the failure. As already described, there is the ability to mask off a failing BBU Detect so the system and BBU can continue to function without a redundant supply. However, if the BBU Detect is valid, meaning that the BBU is not supplying adequate power to the power supplies because of a component failure or because the batteries are not fully charged or detective, for example, then the system is going to crash if utility power is not restored or some other remedial action is taken, such as bringing on-line a redundant BBU, for example.

One might assume that all of the enabled power supply front-ends would simultaneously report a voltage decrease through their respective +BBU_DETECT signals upon loss of AC mains. However, depending on the respective loads on the power supplies, one power supply might be more sensitive to an AC mains loss than the others, i.e., the voltage decrease at the power supply front-end may occur more rapidly due to a faster discharge of the voltage stored on the capacitance C, for example. This is one reason why a detect signal from each on-line power supply front-end should preferably be provided. Due to the OR function 316, as explained above, any one of the enabled detect signals can cause battery back-up to come on-line.

Considering FIG. 2 again, the BBU 210 also includes the AC sensor 223 which senses the AC mains input 102 to the BBU 210 and provides an AC_DETECT signal to microcontroller 224 as mentioned above. In this way, after battery back-up has been initiated, when AC mains input voltage is sensed as restored to an ample level, the microcontroller 224 can act as described above to disconnect the no longer needed battery string output power from the BBU output. Whenever the voltage of the AC mains input is high enough to power the power supplies, the AC_DETECT signal from the AC sensor 223 in the battery back-up unit 210 is active.

As mentioned, the AC_DETECT information provided to the battery system microcontroller 224 can also be provided to an external monitoring and control system, e.g., SPCN, during a response to a query status command, for example. With this information, SPCN may command the battery back-up unit 210 to disconnect the battery back-up power from the power system output because input AC is high enough to run the power supplies.

However, if the AC mains is a high impedance, or if the AC mains fails again, the battery back-up would be reconnected to the power system output whenever any of the enabled +BBU_DETECT signals go high, as long as enabled by SPCN.

In FIG. 2, the +BBU_DETECT signals were derived from a comparator and voltage divider arrangement. In FIG. 3, the +BBU_DETECT signals 227, 228, 229 are illustrated as being provided in a slightly different manner than was shown in FIG. 2. In particular, these signals are shown as being derived from an FET output. A respective +BBU_

DETECT signal is high when the corresponding FET 322 is in an OFF state, and is low when the FET 322 is in an ON state. The gate of the respective FET 322 would be connected so that the FET 322 is ON when the voltage in the respective power supply front-end is at or above the reference threshold voltage, and the FET 322 is OFF when a voltage decrease below the reference threshold is present. Once skilled in the art would understand that there may be any number of ways to implement circuitry to provide the voltage sensing required, and the invention is not necessarily limited to any particular voltage sensing circuitry implementation.

The signal +BBU_OFF is provided to the reset (R) input of the latch 318, and could be used for other signalling outside the scope of this disclosure, as would be apparent to one skilled in the art.

Figure 4:
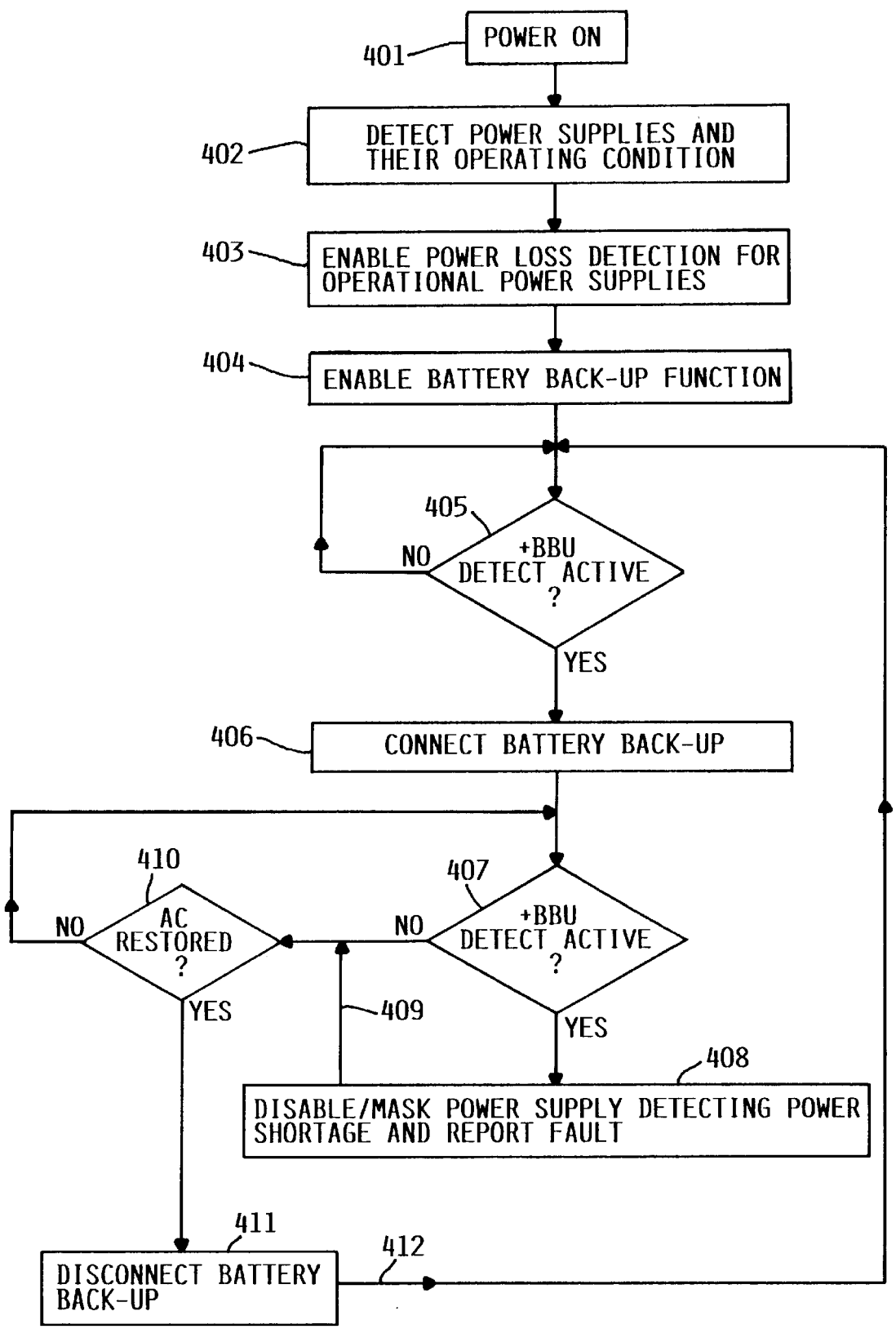
FIG. 4 illustrates a flow chart of an exemplary embodiment of a method of controlling battery back-up according to the present invention.

FIG. 4 illustrates a flow chart of a battery back-up method according to an exemplary embodiment of the invention as described with respect to FIGS. 2 and 3.

At system power on, block 401, SPCN turns on installed power supplies and then checks them for normal operational status at block 402. At block 403, SPCN sends a command to the BBU to enable the BBU Detect circuits for the detected and operational power supplies, and then enables the BBU at block 404.

When a power loss (brownout or complete utility failure) occurs, the BBU Detect signals from one or more power supplies are detected at 405 and cause the battery string to be switched on. This happens quickly at block 406 and without requiring any processing by the microprocessor (as can be seen from FIG. 3) or SPCN.

SPCN is continually polling the BBU for its status via the serial interlace between SPCN and the BBU. When SPCN sees that the batteries have been switched on line via a signal derived from the current sense resistor R 220, it will examine the state of the BBU Detect signals at 407. If no BBU Detect signal is active, either the utility power has been restored or the battery is supplying the required energy to each power supply. SPCN therefore examines the status of the AC sensor at 410 and if utility power has been restored, the BBU is switched off at block 411. Flow 412 then returns to test for BBU Detect signals at 405. However, if utility power has not been restored (NO at 410), the battery remains on and SPCN continues to query the BBU at 407 until power is restored to the BBU, the system powers off, or the battery runs out of energy.

At 407, if a BBU Detect signal is active, then the respective power supply is failing or the BBU is unable to supply the required energy. In the latter case, the system is about to lose all power so no further operation will occur. In the first case, where a power supply is failing, SPCN will issue a command to the BBU to disable the BBU Detect signal from the failing power supply (mask it off) and report a failure (fault) at block 408. The flow 409 then proceeds to block 410 to examine the AC Loss sensor just as if no BBU Detect signal were initially active. If this event was due only to a power supply failure or if service personnel had unplugged a single previously failing supply for concurrent maintenance, for example, then the AC Loss sensor will indicate that utility power is available and SPCN will issue a command to turn the battery string off at 411. Flow 412 then returns to test for BBU Detect signals at 405.

As mentioned earlier, there may be any number of additional fault handling actions implemented should a power supply fault be detected, and these are generally beyond the scope of this disclosure.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

What is claimed is:

1. In a power system, having a battery back-up unit including battery back-up circuitry and at least one battery which can be selectively connected to an output of the battery back-up unit, the power system further having a plurality of power supplies, each power supply being connected to the output of the battery back-up unit, and each power supply having a front end section including a power factor correction circuit with a boost stage providing an output voltage, a method of controlling battery back-up comprising:

monitoring respective boost stage output voltages of the plurality of power supplies by comparing each of the boost stage output voltages of the plurality of power supplies with a respective reference threshold voltage; and when the monitoring indicates a respective boost stage output voltage is lower than the respective reference threshold voltage, signaling the battery back-up circuit and providing battery power to the plurality of power supplies by connecting the battery back-up circuitry to the output of the battery back-up unit.

2. The method according to claim 1, further comprising: signaling a fault of a respective power supply when the monitoring indicates a respective boost stage output voltage is lower than the respective reference threshold voltage after the battery back-up circuit has been brought on-line.

3. The method according to claim 1, further comprising: sensing a line voltage input to the battery back-up unit; and if the sensed line voltage input is at or above the line voltage threshold level, and the battery back-up circuitry is connected to the output of the battery back-up unit, then signaling the battery back-up circuit to disconnect the battery back-up circuitry from the output of the battery back-up unit.

4. In a power system, having a battery back-up unit including battery back-up circuitry and at least one battery which can be selectively connected to an output of the battery back-up unit, the power system further having a plurality of power supplies, each power supply being connected to the output of the battery back-up unit, each power supply having a front end section including a power factor correction circuit with a boost stage providing an output voltage, wherein the power system has an interface to a power control network, a method of controlling battery back-up comprising:

monitoring respective boost stage output voltages of the plurality of power supplies by comparing each of the boost stage output voltages of the plurality of power supplies with a respective reference threshold voltage;

when the monitoring indicates a respective boost stage output voltage is lower than the respective reference threshold voltage, signaling the battery back-up circuit and providing battery power to the plurality of power supplies by connecting the battery back-up circuitry to the output of the battery back-up unit;

sensing a line voltage input to the battery back-up unit;
if the sensed line voltage input is at or above the line voltage threshold level, and the battery back-up circuitry is connected to the output of the battery back-up unit, then signaling the battery back-up circuit to disconnect the battery back-up circuitry from the output of the battery back-up unit; and
communicating power supply information, including voltage level information, between the power control network and the power system.

5. The method according to claim 4, further comprising:
signaling to the power control network with the battery back-up unit of a fault of a respective power supply when the monitoring indicates a respective boost stage output voltage is lower than the respective reference threshold voltage after the battery back-up circuitry has been connected to the output of the battery back-up unit.

6. The method according to claim 4, wherein the method further comprises performing the following with the power control network:
detecting the plurality of power supplies and their operating conditions;
enabling the monitoring for power supplies that are detected to be operational; and
enabling the providing of battery power.

7. In a power system, having a battery back-up unit including battery back-up circuitry and at least one battery which can be selectively connected to an output of the battery back-up unit, the power system further having a plurality of power supplies, each power supply being connected to the output of the battery back-up unit, each power supply having a front end section including a power factor correction circuit with a boost stage providing an output voltage, a method of controlling battery back-up comprising:
monitoring respective boost stage output voltages of the plurality of power supplies by comparing each of the boost stage output voltages of the plurality of power supplies with a respective reference threshold voltage;
when the monitoring indicates a respective boost stage output voltage is lower than the respective reference threshold voltage, signaling the battery back-up circuit and providing battery power to the plurality of power supplies by connecting the battery back-up circuitry to the output of the battery back-up unit;
wherein the monitoring comprises providing the reference threshold voltage to a first input of a comparator, providing a boost stage output voltage representation to a second input of a comparator, and providing an output of the comparator to the battery back-up circuitry.

8. The method according to claim 7, wherein the connecting the battery back-up circuitry to the output of the battery back-up unit comprises receiving the output of the comparator, and controlling a battery back-up circuitry switch based on the comparator output.

9. The method according to claim 8, wherein the controlling the battery back-up circuitry switch further comprises sensing a line voltage input to the battery back-up unit, and controlling the battery back-up circuitry switch based on the sensed line voltage.

10. The method according to claim 9, wherein if the sensed line voltage input is at or above the line voltage threshold level, and the battery back-up circuitry is connected to the output of the battery back-up unit, then the controlling the battery back-up circuitry switch includes disconnecting the battery back-up circuitry from the output of the battery back-up unit.

11. An apparatus comprising:
a battery back-up unit having an output for providing a direct current (DC) output voltage; and
a plurality of power supplies each power supply connected to receive the DC output voltage from the battery back-up unit, each power supply having: power factor correction circuitry (PFC) which produces a corrected output voltage; and sensing circuitry which senses the corrected output voltage and provides a detect signal when the corrected output voltage falls below a threshold reference voltage;
wherein the battery back-up unit includes:
a battery string having at least one battery and a series connected switch; and
control circuitry for controlling the series connected switch based on the detect signals from the respective sensing circuitry in the plurality of power supplies, to connect the battery string to the output of the battery back-up unit when the corrected output voltage in a respective power supply falls below a threshold reference voltage.

12. An apparatus comprising:
a battery back-up unit having an output for providing a direct current (DC) output voltage; and
a plurality of power supplies each power supply connected to receive the DC output voltage from the battery back-up unit, each power supply having: power factor correction circuitry (PFC) which produces a corrected output voltage; and sensing circuitry which senses the corrected output voltage and provides a detect signal when the corrected output voltage falls below a threshold reference voltage;
wherein the battery back-up unit includes:
a battery string having at least one battery and a series connected switch; and
control circuitry for controlling the series connected switch based on the detect signals from the respective sensing circuitry in the plurality of power supplies, to connect the battery string to the output of the battery back-up unit when the corrected output voltage in a respective power supply falls below a threshold reference voltage; and
wherein the sensing circuitry comprises in each respective power supply:
a comparator having first and second inputs, a first input being provided with the threshold reference voltage, and having an output which provides the detect signal; and
a voltage divider connected to divide the corrected output voltage and provide the divided corrected output voltage to the second input of the comparator.

13. The apparatus according to claim 12, wherein the control circuitry comprises:
isolation circuitry which electrically isolates the detect signals from the respective power supplies; and
processing circuitry which receives the isolated detect signals from the isolation circuitry and produces a control signal which controls the series connected switch.

14. The apparatus according to claim 13, wherein the processing circuitry comprises:
a microcontroller; and
logic circuitry.

15. The apparatus according to claim 14, wherein the logic circuitry comprises:
a plurality of first two-input AND gates, each of which receives a respective first enable signal from the microcontroller at a first input and a respective isolated detect signal at a second input and which provide a respective output, there being a respective first AND gate for each respective power supply of the plurality of power supplies;
an OR functional block having a plurality of inputs which receive the outputs of the respective first AND gates, and provides an output;
a second two-input AND gate which receives a second enable signal from the microcontroller at a first input, receives the output of the OR functional block at a second input, and provides an output; and
a latch circuit having a set input which receives the output of the second two-input AND gate, a reset input which receives a reset signal from the microcontroller, and an output which is provided to the microcontroller and to the series connected switch.

16. The apparatus according to claim 15, wherein the microcontroller has an interface to an external control system through which power supply information and control signals are exchanged.

17. The apparatus according to claim 16, wherein the battery back-up unit further comprises:
alternating current (AC) rectifying circuitry which receives an AC line input and provides pulsed DC output at the output of the battery back-up unit; and an input sensor which senses the AC line input and provides an AC detect signal to the microcontroller.

18. The apparatus according to claim 17, wherein the microcontroller controls the latchto disconnect the battery string from the output of the battery back-up unit when the AC detect signal indicates an adequate AC line input to the battery back-up unit.

19. The apparatus according to claim 18, wherein the microcontroller reports a fault condition to the external control system when the battery string is vonnected to the output of the battery back-up unit and a detect signal from a respective power supply still indicates that the corrected output voltage in the respective power supply is below a threshold reference voltage.

20. A method of controlling a power system having input lines and battery back-up circuitry for backing up a plurality of power supply loads when a power loss due to a loss of power on the input lines from an external power source, or a loss of power due to a failure of a component of the power system occurs, comprising:
detecting the plurality of power supply loads and power supply load operating conditions at powering-on of the power system;
enabling power loss detection for selected operational power supply loads of the plurality of power supply loads;
enabling battery back-up operation;
monitoring the power system for a power loss in the selected operational power supply loads of the plurality of power supply loads;
if a power loss is detected in the selected operational power supply loads of the plurality of power supply loads, connecting the battery back-up circuitry to the plurality of power supply loads, and continuing to monitor the power system for a power loss in the selected operational power supply loads of the plurality of power supply loads; and
if a power loss is detected in any one of the selected operational power supply loads of the plurality of power supply loads after connecting the battery back-up circuitry to the plurality of power supply loads, then monitoring the power system input lines for the presence of power and if power is present at the power system input lines, then: disabling only the power supply load in which the power loss is detected, disconnecting only the power supply load in which the power loss is detected, producing a fault signal, and disconnecting the battery back-up circuitry.

21. The method according to claim 20, wherein the power system battery back-up circuitry includes a logic circuit which receives power loss detection signals from the plurality of power supply loads; and wherein the disabling only the power supply load in which the power loss is detected comprises:
masking in the logic circuit the power loss detection signal from the power supply load in which the power loss is detected.

* * * * *

UNITED STATES PATENT AND TRADEMARK OFFICE
CERTIFICATE OF CORRECTION

PATENT NO. : 6,181,029 B1
DATED : January 30, 2001
INVENTOR(S) : Neil C. Berglund, Patrick K. Egan, Steven W. Steele, and John V. Swenson It is certified that error appears in the above-identified patent and that said Letters Patent is hereby corrected as shown below:

Claim 18, Col. 15, Line 34, "latchto" should be --latch to--.

Claim 19, Col. 15, Line 40, "vonnected" should be --connected--.

Signed and Sealed this

Fifth Day of June, 2001

Attest:

Attesting Officer

NICHOLAS P. GODICI
*Acting Director of the United States Patent and Trademark Office*